(12) United States Patent
Speigle et al.

(10) Patent No.: US 7,873,213 B2
(45) Date of Patent: Jan. 18, 2011

(54) SYSTEMS AND METHODS FOR COLOR-DEFICIENT IMAGE ENHANCEMENT

(75) Inventors: Jon M. Speigle, Vancouver, WA (US); Gregory Eugene Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1083 days.

(21) Appl. No.: 11/535,416

(22) Filed: Sep. 26, 2006

(65) Prior Publication Data

US 2008/0075364 A1    Mar. 27, 2008

(51) Int. Cl.
G06K 9/00    (2006.01)
G06K 9/40    (2006.01)
(52) U.S. Cl. ...................... 382/167; 382/274
(58) Field of Classification Search ............... 382/254, 382/274, 162, 167; 351/242, 239, 246, 241; 351/243; 358/518, 520; 345/600, 601
See application file for complete search history.

(56) References Cited

U.S. PATENT DOCUMENTS

| | | | |
|---|---|---|---|
| 4,848,898 A | 7/1989 | Massof | |
| 5,297,559 A | 3/1994 | Severns | |
| 5,409,760 A | 4/1995 | Neitz et al. | |
| 5,589,898 A | 12/1996 | Atkinson | |
| 6,309,117 B1 | 10/2001 | Bunce et al. | |
| 6,985,524 B1 * | 1/2006 | Borchers | 375/240 |
| 7,145,571 B2 * | 12/2006 | Jones et al. | 345/589 |
| 2004/0212815 A1 | 10/2004 | Heeman et al. | |
| 2009/0132911 A1 * | 5/2009 | Detlef et al. | 715/234 |

FOREIGN PATENT DOCUMENTS

JP    63-282883    11/1988

OTHER PUBLICATIONS

Brettel, H., F. Vienot, J.D. Mollon, "Computerized simulation of color appearance for dichromats," J. Opt. Soc. Am. A, 14, (1997) pp. 2647-2655.
Capilla, P.; M.A. Diez-Ajenjo; M.J. Luque & J. Malo. "Corresponding-pair procedure: a new approach to simulation of dichromatic color perception," J. Opt. Soc. Am. A, 21 (2004) pp. 176-186.
Meyer, G.M.; D.P. Greenberg "Color-defective vision and computer graphics display," IEEE Computer Graphics & Applicationa, 8, (1988) pp. 28-40.
Walraven, J.; K.W. Alferdinck "Color displays for the color blind," Proc. IS&T/SID, Fifth Color Imaging Conference, Nov. 17-20, 1997, pp. 17-22.
Vienot, F.; H. Brettel; J.D. Mollon, "Digital video colourmaps for checking the legibility of displays by dichromats," Color Research & Application, 24, (1999) pp. 243-252.
Japanese Patent App. No. 2007230257—Office Action dated Nov. 4, 2009.

* cited by examiner

*Primary Examiner*—Yon Couso
(74) *Attorney, Agent, or Firm*—Chernoff, Vilhauer, McClung & Stenzel

(57) ABSTRACT

Embodiments of the present invention comprise systems and methods for processing images for enhanced viewing by color-deficient viewers.

20 Claims, 10 Drawing Sheets

Normalized short-wavelength (S), middle-wavelength (M), and long-wavelength (L) Smith-Pokorny cone sensitivities.

Lines of confusable colors for protan, deutan, and tritan dichromats.

Projection axes for dichromatic simulation model.

Enhancement transformation example.

SYSTEMS AND METHODS FOR COLOR-DEFICIENT IMAGE ENHANCEMENT

BACKGROUND OF THE INVENTION

Individuals are considered "colorblind" or "color deficient" when they are unable to distinguish colors that are distinguishable by a color-normal observer. Color-normal observers require three adjustable primaries to match any given light stimulus and use specific ratios in their matches. Approximately 8% of male observers have some form of colorblindness. Approximately 6% of male observers are considered "anomalous trichromats", still requiring 3 primaries for color matches, but having lower color discrimination performance than color-normal observers. Approximately 2% of male observers exhibit "dichromatic" colorblindness, meaning that they use only two primaries to perform color matches.

When colorblind observers view soft- and hard-copy material designed for color-normal observers, certain color differences, visible to the color-normals, will not be visible to the color deficient observers. This can result in difficulties reading colored text, locating colored objects, or discriminating business graphics or map content distinguished primarily by color. A concrete example of this problem is the typical usage of red and green differentiation of graphical content, which for the more common types of colorblindness will appear to be the same hue.

The proposals to address this problem have not been totally effective. One method is to supply the colorblind observer with optical devices that differentially apply color filters to the two eyes. The goal is to restore discriminability to colors that the colorblind observer is unable to distinguish. While such a method may improve discriminability for some colors, it will also shift the discriminability problem to other colors. Another method available to colorblind computer users is to adjust or select a color lookup table ("LUT") to remap colors so that problematic colors are mapped to ones with higher color contrast. This method can be applied globally, affecting the entire display, by palletizing the entire display content. If the entire display is not palletized, the manipulation will only be effective on palettized content to which the LUT is applied. The palette can introduce other artifacts such as contouring due to the limited palette size.

The problem of colorblindness has also been addressed by providing methods for simulating the appearance of the different types of color deficiencies. Such a method can be used by a graphic designer to adjust the display content so as to maintain color discriminability for colorblind observers. Several similar methods of simulating dichromatic color appearance have been proposed. In each, a locus is selected for the xy chromaticities that represent the same color sensations for the dichromat and trichromat. Chromaticities corresponding to pixels in an image are then projected onto the locus to generate an image that will be seen as equivalent by the given dichromat. The chromaticities in the resultant image will be confined to the locus and will approximately equate the color sensations for dichromatic and trichromatic viewers. The final implementation of the simulation may be on the pixel color values or on a set of color palette entries.

The cause of colorblindness is related to processing in the three classes of sensors in the eye. These are referred to as L, M or S cones depending on whether they are most sensitive to long, middle or short wavelengths of light, respectively. The most typical forms of colorblindness are related to signaling by the long- or medium-wavelength sensitive cone classes. In anomalous trichromats, the cone spectral sensitivities are different from the color-normal observer, while in a true dichromat, a cone class is missing. A rarer form of colorblindness is related to signaling by the short-wavelength sensitive cone class.

FIG. 1 illustrates the sensitivities of the three L (2), M (4), and S (6) cone classes found in a trichromatic, color-normal eye. In dichromats, one of these sensor classes is either replaced with one of the remaining classes or a signal transduction problem prevents normal processing of signals from that cone class. The result is that color vision becomes two-rather than three-dimensional. While a trichromat requires three distinct lights to match an arbitrary light, dichromats require only two lights and an intensive adjustment. In FIG. 1, normalized short-wavelength is shown at (S) 6, middle-wavelength at (M) 4, and long-wavelength at (L) 2 for Smith-Pokorny cone sensitivities.

Dichromats are referred to as "protanopes", "deuteranopes", or "tritanopes", depending on whether the L, M, or S cone class is deficient, respectively. Experiments have been conducted that identify the confusable colors for each type of dichromat. See Wyszecki, G.; W. S. Stiles (1982) *Color science: Concepts and methods, Quantitative data and formulae*, Wiley; hereby incorporated herein by reference.

In the colormetry system CIEXYZ advanced by the Commission International de l'Eclairage (CIE), an independent colorimetry system called CIEXYZ is presented. In this tristimulus system, X, Y, and Z denote the mixture of light in a three primary system that characterizes colors that match to the color-normal observer. In order to facilitate the interpretation of data in the CIEXYZ system, CIE developed the ClExyY system, where the two variables x and y describe chromaticity while the variable Y describes the intensive attribute and is referred to as the luminance of the color.

FIG. 2 illustrates the confusion lines for protan, deutan, and tritan dichromats on a CIE xy chromaticity diagram. Points along each line represent stimuli that produce the same response from the remaining cone classes. To a trichromat, these points are distinguishable; to the given dichromat, they are not.

Anomalous trichromats possess three photopigments, but one or more of the pigments are shifted relative to the color-normal observer. The terms "protanomalous", "deuteranomalous", and "tritanomalous" are used, according to the affected photopigment. For these anomalous trichromat observers, color discrimination may be nearly as good or worse than a color-normal trichromat, depending on the degree of separation between shifted photopigments. As such, color enhancement methods designed for dichromats may also alleviate poor color discriminability for anomalous trichromats.

BRIEF SUMMARY OF THE INVENTION

Some embodiments of the present invention comprise systems and methods for content-type-specific image processing for increased image discriminability by color-deficient observers.

Some embodiments of the present invention comprise systems and methods for document-type-specific image processing for increased image discriminability by color-deficient observers.

Some embodiments of the present invention comprise systems and methods for color-deficiency-type-specific image processing for increased image discriminability by color-deficient observers.

The foregoing and other objectives, features, and advantages of the invention will be more readily understood upon

BRIEF DESCRIPTION OF THE SEVERAL DRAWINGS

DETAILED DESCRIPTION OF EXEMPLARY EMBODIMENTS

Figure 1:
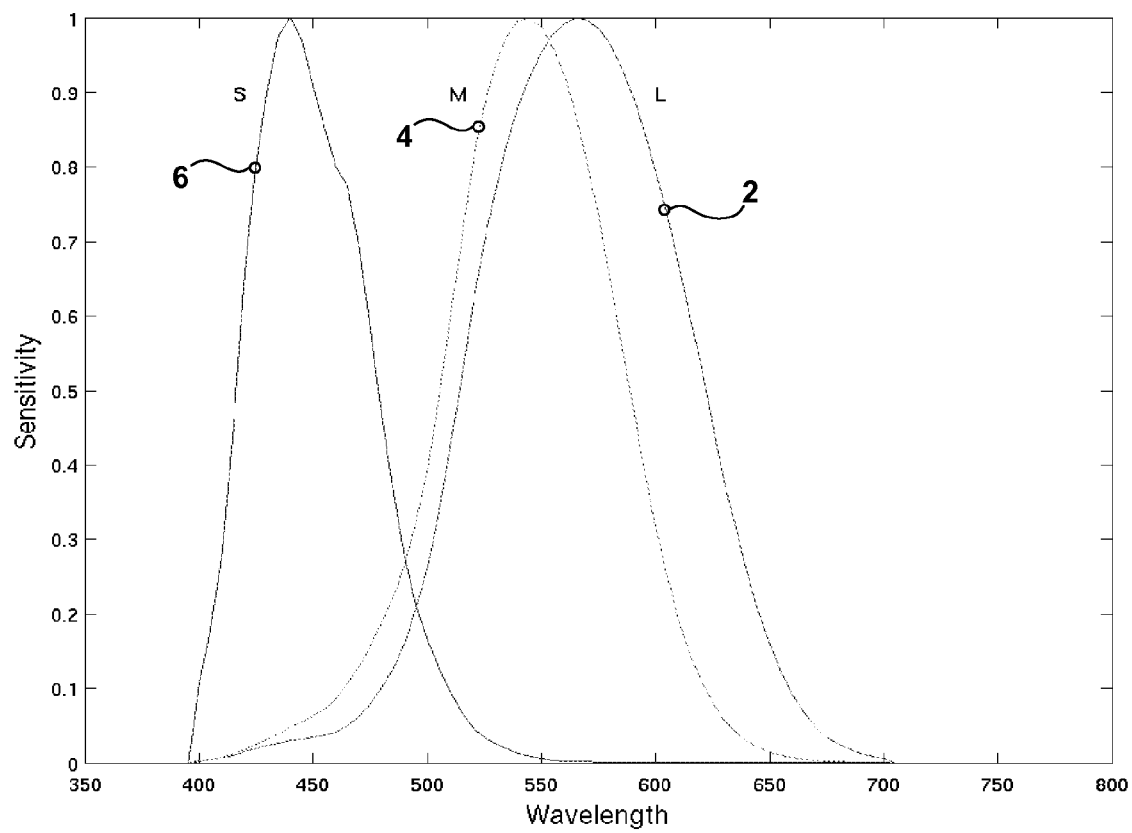
FIG. 1 is a graph showing normalized short wavelength, middle wavelength and long wavelength cone sensitivities.
Figure 2:
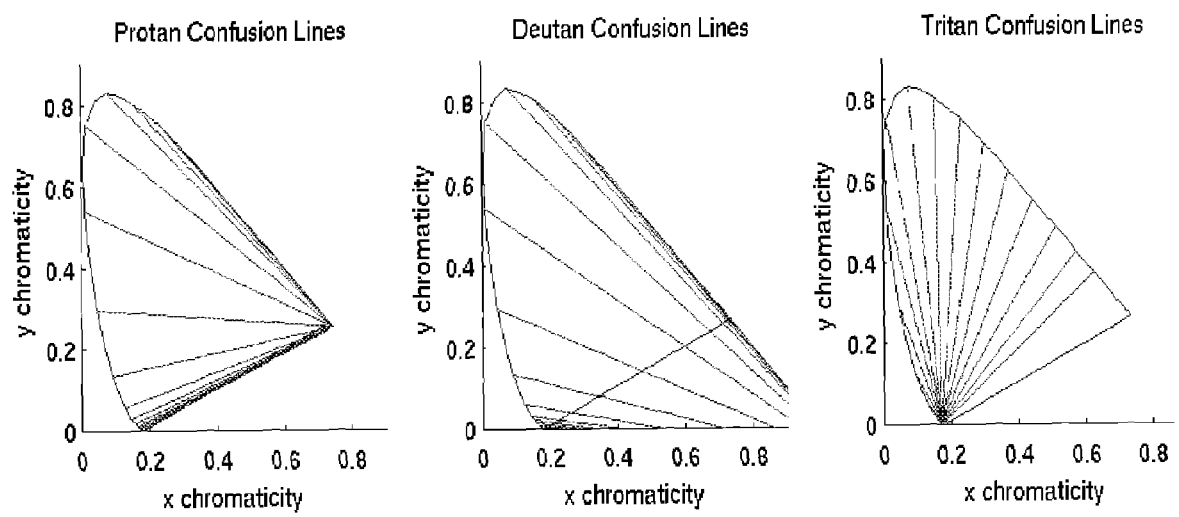
FIG. 2 is a series of charts showing lines of confusable colors for protan dichromats, deutan dichromats and tritan dichromats.

Some embodiments of the present invention may modify document or graphic-display content such that discriminability is improved or restored for colorblind and color deficient observers. Some embodiments of the present invention may modify content to remain acceptable to a color-normal observer. The importance of these two goals may be given varied weight by a user or an automated or semi-automated process leading to relatively weaker or stronger enhancements.

Some embodiments of the present invention are aimed at alleviating the colorblindness problems either in printed- or soft-copy using color transformations. More optimal transformations can be applied given knowledge of the particular type of color deficiency. The color enhancements described may be used in a manner responsive to document content.

Some embodiments of the present invention may be used in an image processing pipeline in which content is identified and where different optimal enhancements are applied to different content-types. This allows more aggressive enhancements to be used for certain content such as colored text, maps or business graphics, for which color-normal observers can be expected to have weaker color preferences.

A benefit of some embodiments of the present invention is to manipulate color values in a printed or displayed image so that color discriminability is improved for a colorblind or color deficient observer. This may be accomplished by applying a color transformation to pixel values. When some forms of color deficiency result in a reduction of apparent color dimensions from 3 to 2, it may not be possible to restore the lost sensation dimension, however it is still possible to manipulate colors so that lost or diminished color signals are partially restored by transforming them into the remaining two color dimensions. Some embodiments comprise techniques for this color transformation, and an architecture that can allow selective enhancement based on document content.

Some embodiments of the present invention comprise specific methods of enhancing images or documents for dichromatic viewers by applying a spatially-varying enhancement that depends on document content-type. In some embodiments, the enhancement strength or particular method of enhancement may be based on document content-type.

Using a Dichromatic Color Appearance Simulation, the dichromatic color confusion lines can be represented as lines emanating from the confusion points enumerated in Table 1 (Wyszecki & Stiles, 1982). Points along these lines will be indistinguishable to the dichromat.

TABLE 1

| CIE xy chromaticities of dichromatic confusion points (Wyszecki & Stiles, 1982) | | |
|---|---|---|
| | X | Y |
| Protanope | 0.747 | 0.253 |
| Deuteranope | 1.080 | −0.080 |
| Tritanope | 0.171 | 0.000 |

Existing methods of simulating dichromatic color appearance involve a locus selected for the xy chromaticities, which represent the same color sensations for the dichromat and trichromat. Chromaticities corresponding to pixels in an image are then projected onto the locus to generate an image that will be seen as equivalent by the given dichromat. The chromaticities in the resultant image will be confined to the locus and will approximately equate the color sensations for dichromatic and trichromatic viewers.

Figure 3:
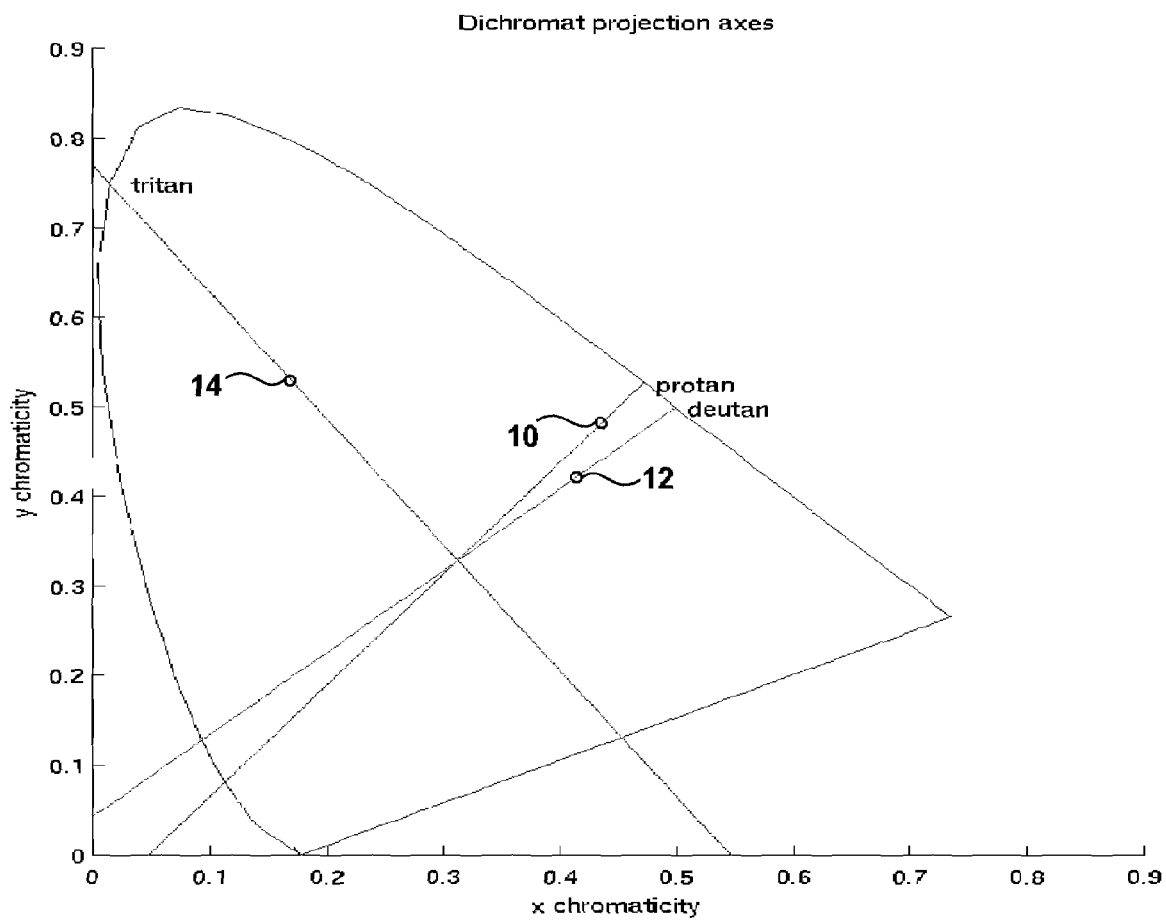
FIG. 3 is a chart showing projection axes for a dichromatic simulation model.

FIG. 3 illustrates a set of loci for the three types of dichromats based on the following criteria. Define the loci to pass through the xy chromaticity values for CIE standard illuminant D6500 (x=0.3127 and y=0.3290). Let one endpoint of the axis correspond to the chromaticities of 574 nm, 578 nm, and 510 nm monochromatic light for the protanopic 10, deuteranopic 12, and tritanopic 14 observers, respectively. The whitepoints and selected points on the spectrum locus (corresponding to the chosen wavelengths) define lines in the 2D iso-luminant plane that cross the majority of confusion lines.

Alternatively, in some embodiments, loci that are curved or that have arbitrary endpoints may be chosen to better coordinate the color percepts between the trichromatic and dichromatic observers. By the definition of confusion line, the original trichromatic images and their projection onto the loci are predicted to be seen as equivalent by the specific type of dichromat.

Dichromatic color appearance can be simulated by projecting colors along the dichromat confusion lines. After converting the input image to CIE xyY, the confusion line for each pixel is defined by the confusion point and the pixel chromaticities. The projection is the intersection of the chosen dichromatic appearance locus and the confusion line. Replacing the pixel chromaticities by the intersection of chromaticities produces an xyY image that will approximate the image seen by the dichromat.

Given the equations for the two lines as $$y=m1*x+b1$$

$$y=m2*x+b2$$

the intersection of chromaticities can be directly computed as $$x0=(b2-b1)/(m1-m2)$$

$$y0=m1*x0+b1$$

Alternatively, the problem can be formulated using linear algebra.

The conversions to and from RGB and CIE XYZ may be based on linear or non-linear regression or on a monitor calibration process.

Using dichromatic and anomalous image enhancement, the overall environment for the correction is described, followed by several specific correction schemes.

Figure 4:
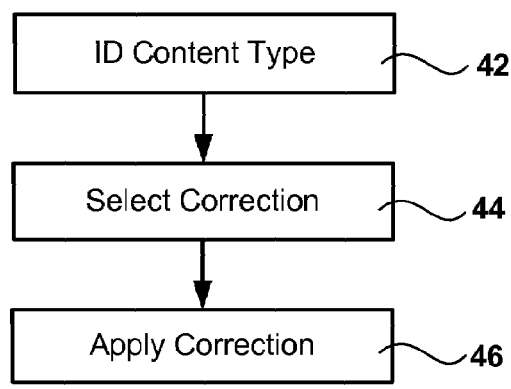
FIG. 4 is a flow chart showing the steps of an embodiment of the present invention.

Some embodiments of the present invention may be described with reference to FIG. 4. These embodiments may be applied within a document display pipeline. In these embodiments, a document may be segmented 42 to identify various content types or classes. These content types or classes may also be identified in other ways. A correction is then selected 44. The correction may be based on a user's particular color deficiency. The correction may also be based on the content type of image elements or a document type. Once a correction is selected, the correction may be applied 46 to the image or one or more regions of the image according to the content type or class of the regions. The components of these embodiments may be set within an overall pipeline for a printer driver, printer controller, copier, scanner, video display, CRT-based document viewing application or some other output or display device.

An initial step of these embodiments comprises identifying object classes 42 within the document. If the input is a raster-based image of a document, a segmentation algorithm may be used to identify text, pictorial, map, business graphic or other content. If the input is vector-based (e.g., graphics device context meta-file commands), then a different classification technique may be used to identify the content classes. For instance, in a vector-based document, representative regions of colored solid fill, colored text, or colored line elements may be identified.

A subsequent step of these embodiments comprises selection of a correction 64 on a class-by-class or element-by-element basis, taking into consideration the given set of content classes and the given labeling or separation of elements. The correction may also be selected based on document type and/or color-deficiency type when known.

Selecting the correction can be accomplished in several ways. In some embodiments of the present invention, the user or system may select a specific class of dichromacy. If an observer does not know his or her specific colorblindness type, some embodiments may administer a computer-controlled colorblindness test to diagnose the observer's condition. Based on information of the observer's color deficiency, an optimal enhancement scheme may be selected for that specific type of deficiency. In some embodiments of the present invention, a default enhancement may be used, such as one that is effective for one or more common types of protanopic or deuteranopic colorblindness. A compromise enhancement of this sort may be sub-optimal in quality when compared to the enhancements for a specific type of deficiency, however these embodiments may be easier to implement in lower-cost devices and avoid the process of administering a diagnostic colorblindness test.

In some embodiments, the enhancement correction selection 44 may also be based on the document object class. In some embodiments, enhancement strength or some other variable may be varied for specific object classes.

Because the nature of the enhancement distorts the content pixels, a dichromat enhancement may be viewed as a degradation or distortion by a trichromatic observer. For colored text, map, or non-photo content, stronger corrections could be applied than for photo regions, because for these content classes, strong color preferences may not exist.

In some embodiments, user input may also be used to control an enhancement strength or some other enhancement variable. This type of control is often ideally suited for an application where the dichromat would be the only viewer (e.g., for crt-based or hand-held displays).

In some embodiments, an enhancement protocol is a pointwise, matrix-based color conversion. In this approach, a matrix is applied to input color vectors on a pixel-by-pixel basis. The matrix can be defined based on knowledge of the type of dichromacy and will transform input color values to produce larger responses in the dichromat's remaining cone classes. An example matrix is given below for a protanopic observer. This matrix is designed to be applied to color values in a cone LMS colorspace.

$$M\_lms = \begin{bmatrix} 1 & a & b \\ 0 & 1 & 0 \\ 0 & 0 & 1 \end{bmatrix}$$

The 'a' and 'b' terms will control the added distortion to the original image. As their magnitudes increase, larger M and S cone signals will be added in proportion to the amount of L cone signal. Similar matrices can be defined for the other types of dichromacy. Small off-diagonal terms will correspond to small distortions to the original image.

The LMS color enhancement matrix can be converted to another colorspace, such as CIE XYZ, by pre- and post-multiplication by colorspace conversion matrices. The following matrix, M_xyz, would then be applied in the XYZ colorspace.

$$M\_xyz=M\_lms\_to\_xyz*M\_lms*M\_xyz\_to\_lms$$

The conversions to and from the XYZ and LMS colorspaces may be computed via linear regression or some non-linear method. If the colorspace is not a linear transform of the cone or XYZ colorspace, then non-linear forward and inverse transformations could be concatenated with the enhancement matrix. The overall manipulation may be represented as a series of processing steps or combined within a lookup-table that maps from the input color values to the corrected color values.

The third step of the process comprises applying 46 the correction to the class or elements. Corrections determined in this process may be applied in a spatially-varying fashion within a single document.

Figure 5:
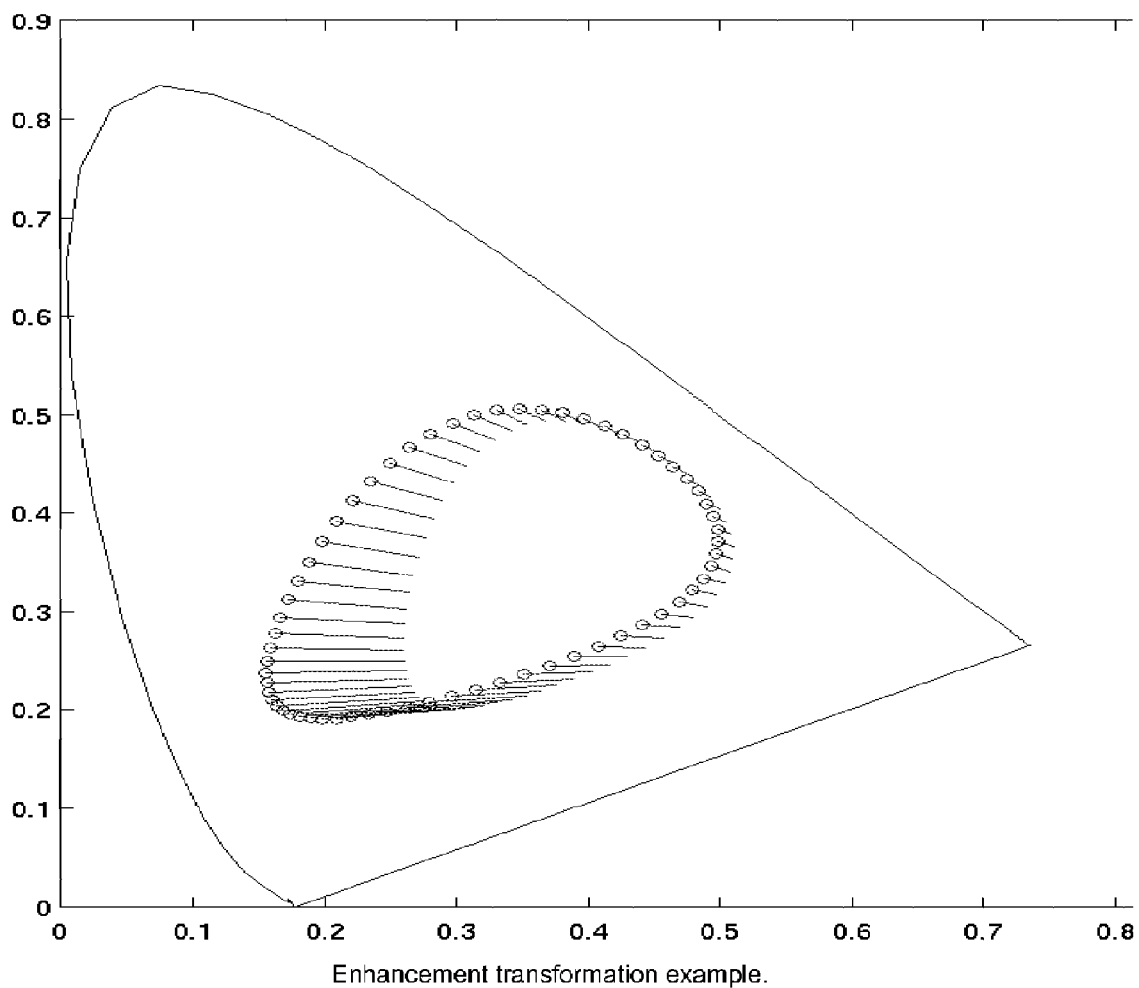
FIG. 5 is a chart showing an exemplary enhancement transformation.

The results of this type of manipulation will be an improvement for the dichromat in color contrast and a partial restoration of brightness. An illustration of the color shift introduced by this transformation on an xy chromaticity diagram is shown in FIG. 5. For a set of lab colors equally-spaced in hue angle, this plot shows the colors before mapping as open circles. Each vector endpoint indicates the post-transformation values.

In the anomalous trichromatic visual system, color discrimination performance can also be affected. The degree of degradation will be dependent on the magnitude of shift in the color-normal trichromatic photopigments. A similar matrix-based approach may be taken for the anomalous trichromat. For an anomalous trichromat, weaker enhancement signals could be sufficient, producing an improvement for the anomalous trichromat while maintaining higher fidelity for the normal trichromat.

Alternatively to a matrix-based enhancement, a lookup-table (LUT) based approach may also be used. A LUT-based approach is more flexible because it permits different manipulations to be used in different regions of colorspace. A LUT-based implementation may be preferable for computational reasons.

Embodiments of the present invention comprise correction methods and systems based on various combinations of content type, document type, color-deficiency type and other factors.

Figure 6:
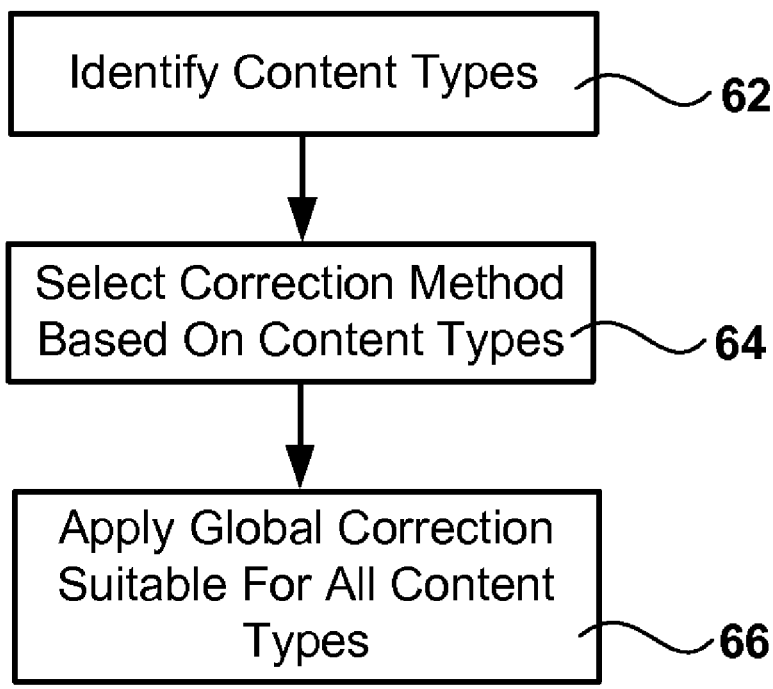
FIG. 6 is a flow chart showing the steps of an embodiment of the present invention comprising global correction based on content type.

In some embodiments of the present invention, illustrated in FIG. 6, a document is analyzed to identify content types 62 in the document using methods described above or other methods known in the art. A correction method is then selected 64 based on the content types in the document. A correction method may be selected 64 to provide an single enhancement for all content types in the document. This correction may be a combination or compromise enhancement that will enhance all object types in the document. This correction may then be applied 66 globally to all document content.

Figure 7:
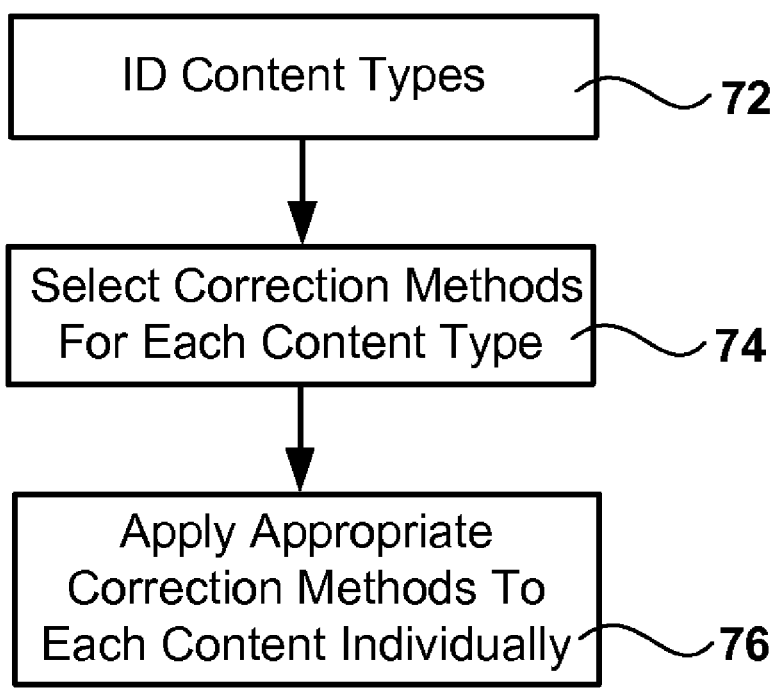
FIG. 7 is a flow chart showing the steps of an embodiment of the present invention comprising content-type-specific correction based on content type.

Some embodiments of the present invention may be described with reference to FIG. 7. In these embodiments, a document is analyzed to identify 72 content types. One or more correction methods may then be selected, calculated or otherwise generated 74. An appropriate correction method may then be applied to each content type individually. In these embodiments, an optimal correction may be applied to each content type in a separate operation.

Figure 8:
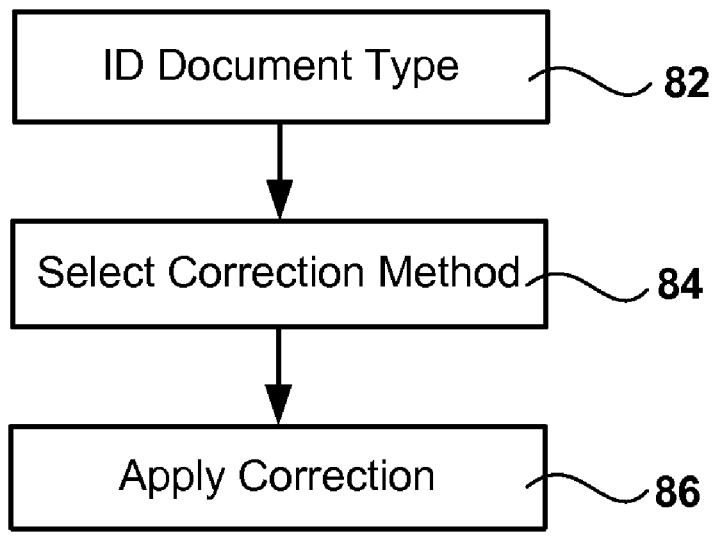
FIG. 8 is a flow chart showing the steps of an embodiment of the present invention comprising correction based on document type.

In other embodiments of the present invention, illustrated in FIG. 8, a correction may be based on the document type. In these embodiments, a document is analyzed to identify 82 the document type. This may be performed by simple analysis of the document file name, file location, file type or by more complex methods. An appropriate correction method may then be selected 84 based on the document type. The selected correction may then be applied 86 to the document.

Figure 9:
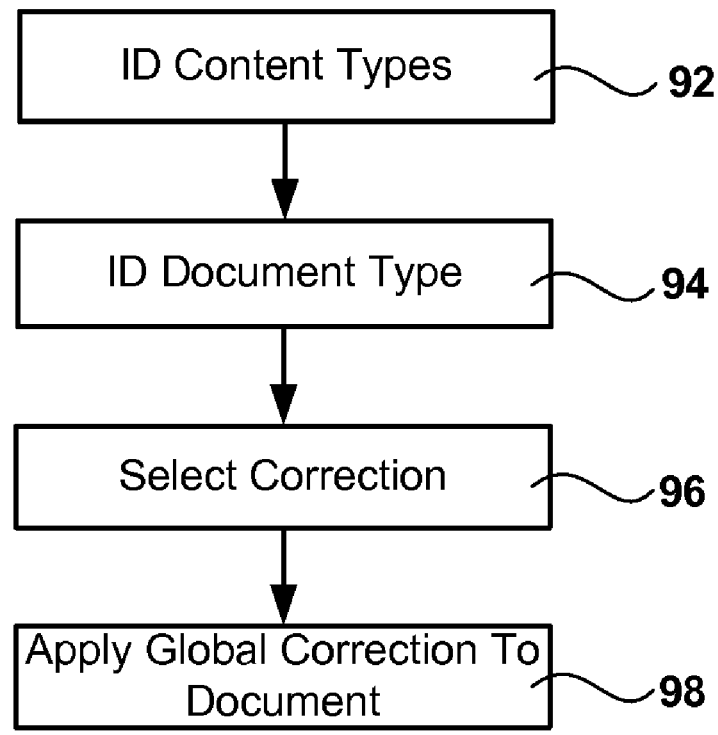
FIG. 9 is a flow chart showing the steps of an embodiment of the present invention comprising global correction based on content type and document type.

Some embodiments of the present invention may be described with reference to FIG. 9. In these embodiments the content types of a document are identified 92. The document type may also be identified 94. Based on the document type and content type, a correction may then be determined 96. This correction may be optimized for application to the entire document. The correction may then be applied 98 globally to the document.

Figure 10:
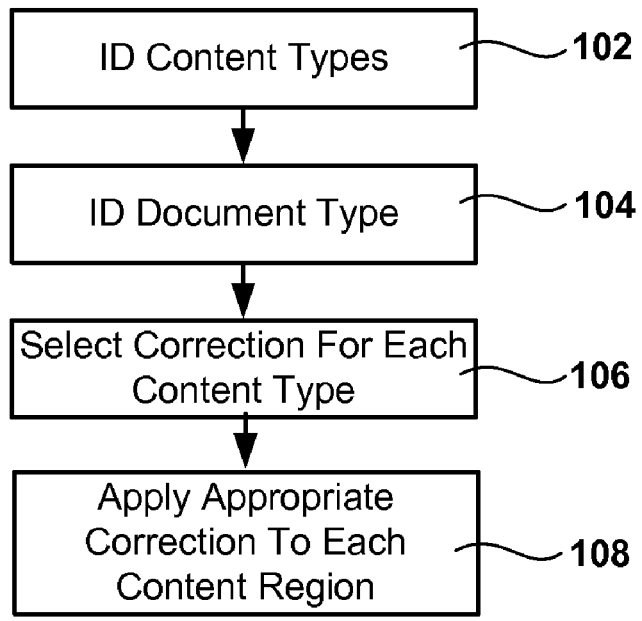
FIG. 10 is a flow chart showing the steps of an embodiment of the present invention comprising content-type-specific correction based on content type and document type.

Some embodiments of the present invention may be described with reference to FIG. 10. In these embodiments the content types of a document are identified 102. The document type may also be identified 104. Based on the document type and content type, one or more corrections may then be determined 106. These corrections may be optimized for each content type and applied to each content type individually. These corrections may then be applied 108 individually to each content type or set of content types in the document.

Figure 11:
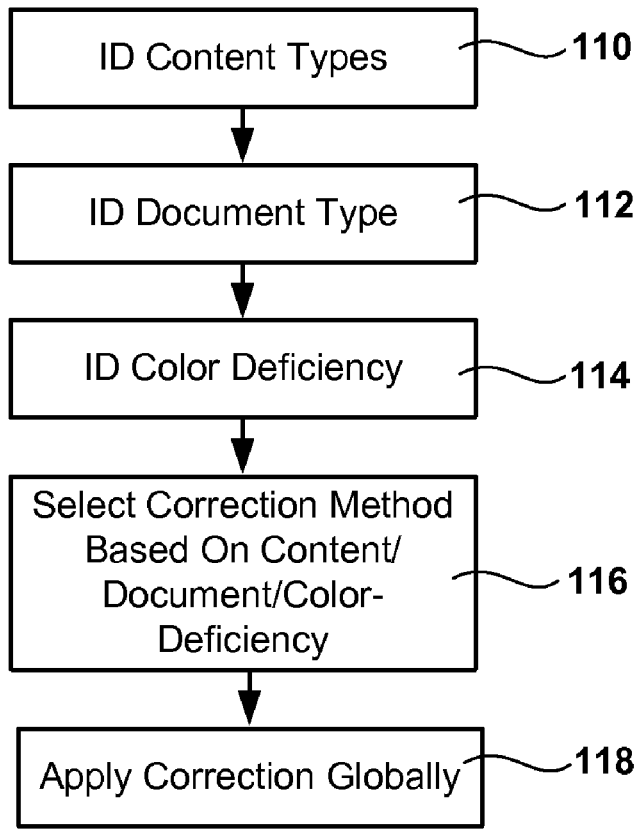
FIG. 11 is a flow chart showing the steps of an embodiment of the present invention comprising global correction based on content type, document type and color deficiency type.

Other embodiments of the present invention, illustrated in FIG. 11, may use a color-deficiency type in determining an appropriate correction method. In these embodiments, a document is analyzed to identify 110 content types in the document. The document type may also be determined 112. This may be performed by simple analysis of the document file name, file location, file type or by more complex methods. A color-deficiency type may also be determined 114. This may be determined by user input, user testing or by other methods. An appropriate correction method may then be determined 116 based on a combination of content type, document type and the color-deficiency type. The selected correction may then be applied 118 to the document globally.

Figure 12:
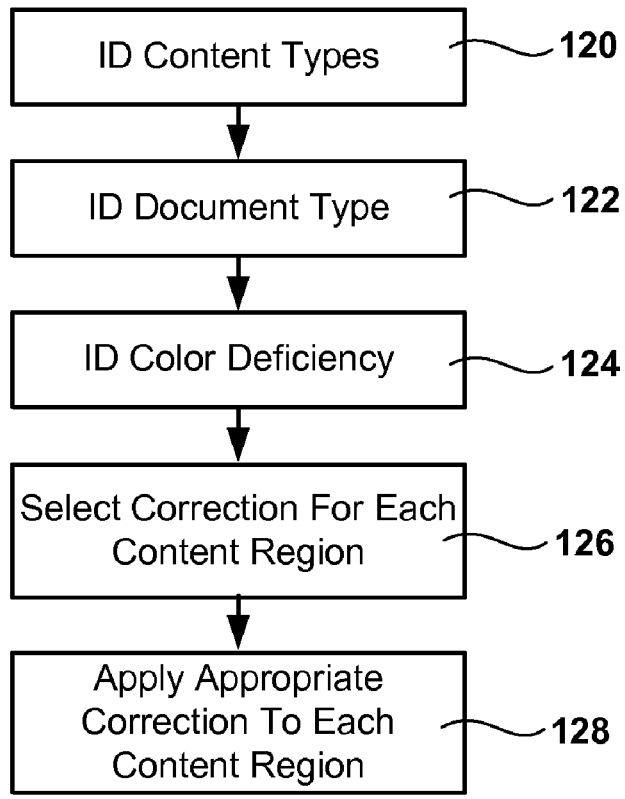
FIG. 12 is a flow chart showing the steps of an embodiment of the present invention comprising content-type-specific correction based on content type, document type and color deficiency type.

Other embodiments of the present invention, illustrated in FIG. 12, may use a color-deficiency type in determining an appropriate correction method for each document content type. In these embodiments, a document is analyzed to identify 120 content types in the document. The document type may also be determined 122. This may be performed by simple analysis of the document file name, file location, file type or by more complex methods. A color-deficiency type may also be determined 124. This may be determined by user input, user testing or by other methods. One or more appropriate correction methods may then be determined 126 based on a combination of content type, document type and the color-deficiency type. The selected correction methods may then be applied 128 to each content type in the document or each set of content types individually.

Figure 13:
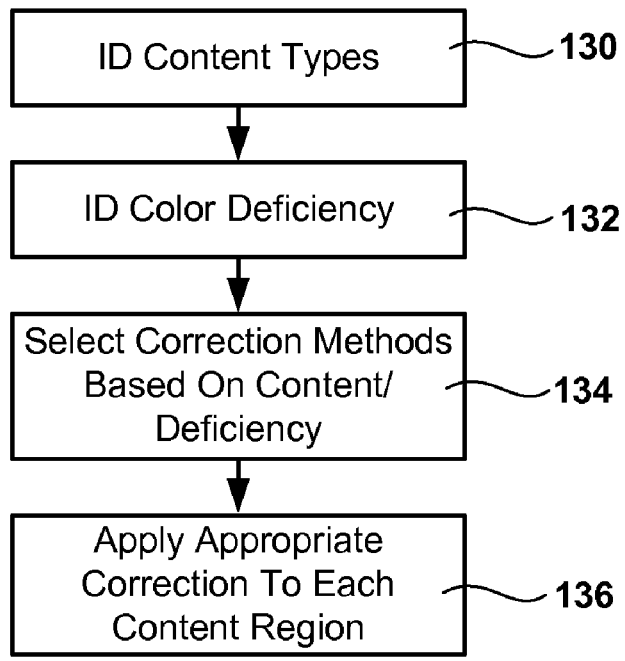
FIG. 13 is a flow chart showing the steps of an embodiment of the present invention comprising content-type-specific correction based on content type and color deficiency type.

Further embodiments of the present invention, illustrated in FIG. 13, may use a color-deficiency type and a content type in determining an appropriate correction method for each document content type. In these embodiments, a document is analyzed to identify 130 content types in the document. A color-deficiency type may also be determined 132. This may be determined by user input, user testing or by other methods. One or more appropriate correction methods may then be determined 134 based on a combination of content type and the color-deficiency type. The selected correction methods may then be applied 136 to each content type in the document or each set of content types individually.

Figure 14:
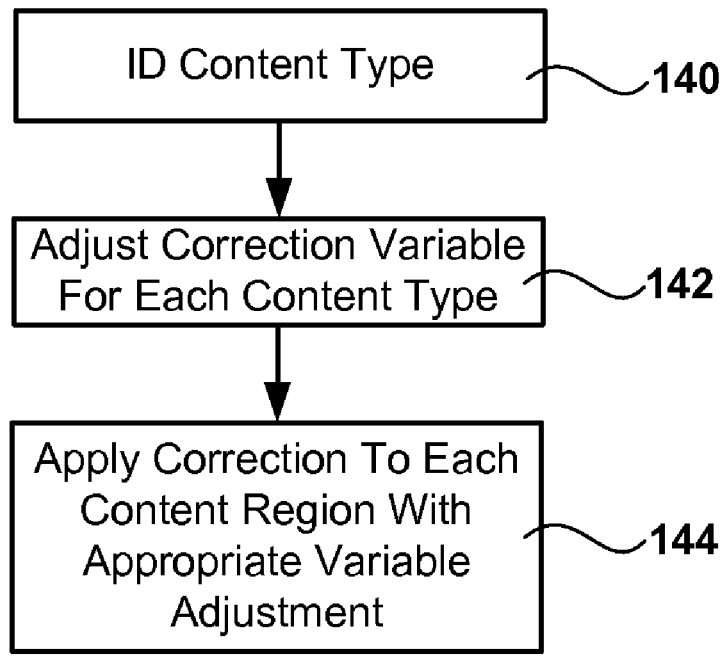
FIG. 14 is a flow chart showing the steps of an embodiment of the present invention comprising variable content-type-specific correction based on content type.

Further embodiments of the present invention, illustrated in FIG. 14, may use a document content type in determining an appropriate correction method for each document content type. In these embodiments, a document is analyzed to identify 140 content types in the document. In these embodiments, a variable correction method may be used in which a variable parameter may be adjusted to vary the correction achieved with the correction method. A variable parameter may be selected 142 for each content type based on the content type(s) found in the image. The selected correction method may then be applied 144 to each content type in the document or each set of content types using the variable parameter adjusted to the specific content type to which it is applied.

Figure 15:
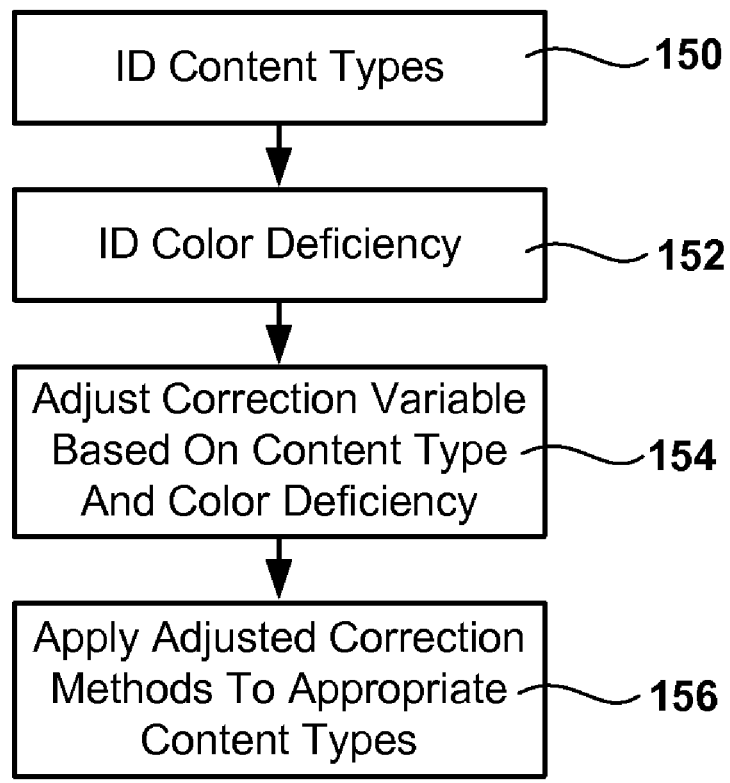
FIG. 15 is a flow chart showing the steps of an embodiment of the present invention comprising variable content-type-specific correction based on content type and color deficiency type.

Other embodiments of the present invention, illustrated in FIG. 15, may use a content type and a color-deficiency type in determining an appropriate correction method for each document content type. In these embodiments, a document is analyzed to identify 150 content types in the document. A color-deficiency type may also be determined 152. This may be determined by user input, user testing or by other methods. In these embodiments, a variable correction method may be used in which a variable parameter may be adjusted to vary the correction achieved with the correction method. A variable parameter may be selected 154 for each content type based on the content type(s) found in the image and the color-deficiency type. The selected correction method may then be applied 154 to each content type in the document or each set of content types using the variable parameter adjusted to the specific content type to which it is applied.

Figure 16:
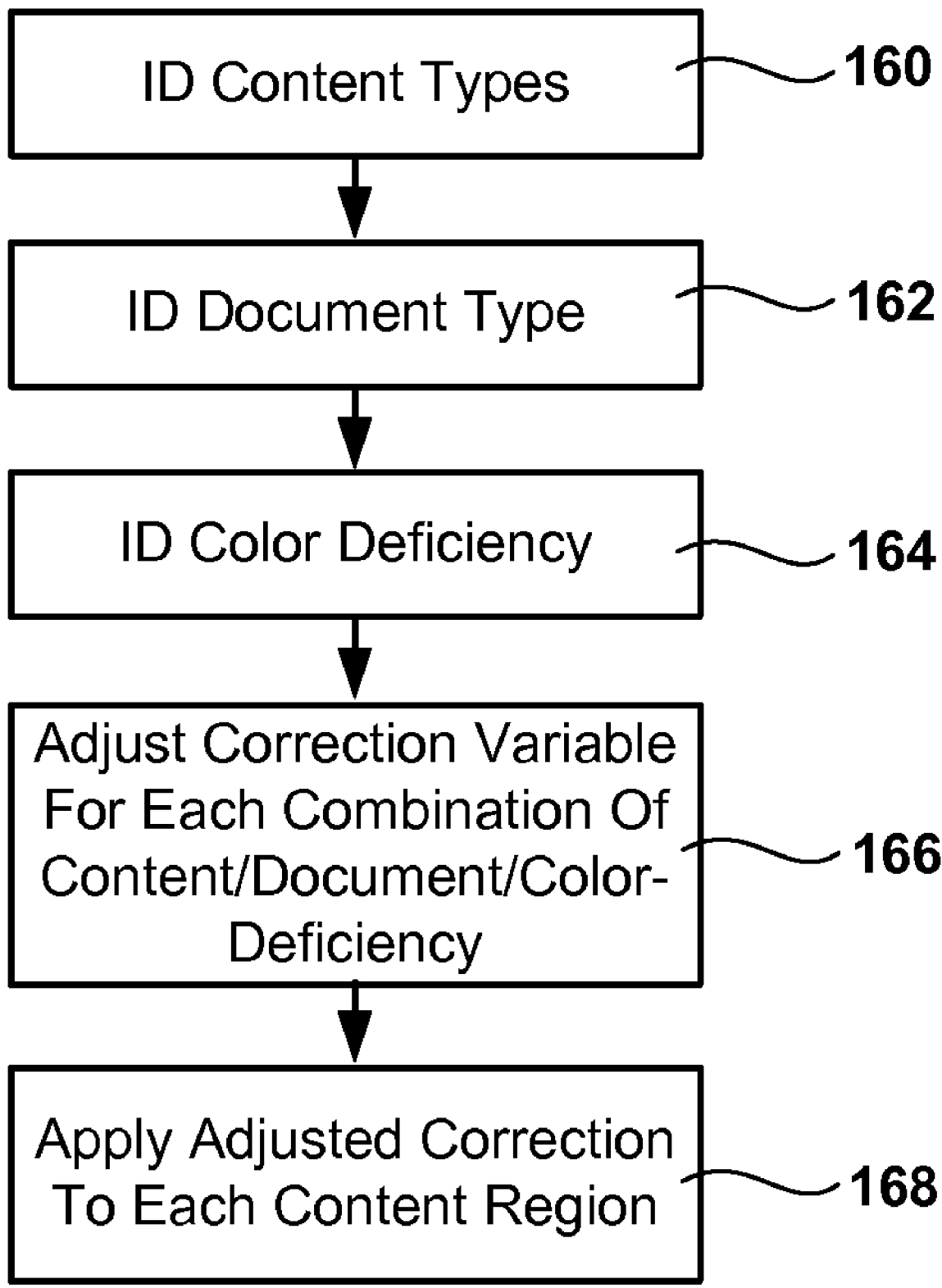
FIG. 16 is a flow chart showing the steps of an embodiment of the present invention comprising variable content-type-specific correction based on content type, document type and color deficiency type.

Other embodiments of the present invention, illustrated in FIG. 16, may use a document content type, a document type and a color-deficiency type in determining an appropriate correction method for each document content type. In these embodiments, a document is analyzed to identify 160 content types in the document. The document type may also be determined 162. This may be performed by simple analysis of the document file name, file location, file type or by more complex methods. A color-deficiency type may also be determined 164. This may be determined by user input, user testing or by other methods. In these embodiments, a variable correction method may be used in which a variable parameter may be adjusted to vary the correction achieved with the correction method. A variable parameter may be selected 166 for each content type based on a combination of content type, document type and the color-deficiency type. The selected correction method may then be applied 168 to each content type in the document or each set of content types using the variable parameter adjusted to the specific content type to which it is applied.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for enhancing a document for improved perception by a visually color-challenged viewer, said method comprising:
   a) identifying a content type in a computer-readable document,
   b) selecting a color-deficiency correction method based on said content type, wherein said selecting is performed by a hardware processor, and
   c) applying said correction method to said image.

2. A method as described in claim 1 wherein said correction method comprises a variable parameter and said variable parameter is varied according to said content type.

3. A method as described in claim 2 wherein said applying said correction is performed globally.

4. A method as described in claim 2 wherein said applying said correction is performed on elements of said content type in said document.

5. A method as described in claim 1 further comprising identifying a document type of said document and wherein said selecting a correction method is also based on said document type.

6. A method as described in claim 5 wherein said correction method comprises a variable parameter and said variable parameter is varied according to at least one parameter selected from the set consisting of said content type and said document type.

7. A method as described in claim 6 wherein said applying said correction is performed globally.

8. A method as described in claim 6 wherein said applying said correction is performed on elements of said content type in said document.

9. A method as described in claim 1 further comprising identifying a color deficiency type of a viewer and wherein said selecting a correction method is also based on said color deficiency type.

10. A method as described in claim 9 wherein said correction method comprises a variable parameter and said variable parameter is varied according to at least one parameter selected from the set consisting of said content type and said color deficiency type.

11. A method as described in claim 10 wherein said applying said correction is performed globally.

12. A method as described in claim 10 wherein said applying said correction is performed on elements of said content type in said document.

13. A method as described in claim 5 further comprising identifying a color deficiency type of a viewer and wherein said selecting a correction method is also based on said color deficiency type.

14. A method as described in claim 13 wherein said correction method comprises a variable parameter and said variable parameter is varied according to at least one parameter selected from the set consisting of said content type, said document type, and said color deficiency type.

15. A method as described in claim 14 wherein said applying said correction is performed globally.

16. A method as described in claim 14 wherein said applying said correction is performed on elements of said content type in said document.

17. A method for enhancing an image for increased perception by a visually-challenged viewer, said method comprising:
   identifying image elements by content type;
   identifying a color deficiency of said viewer;
   selecting a color deficiency correction based on said content type and said color deficiency; and
   adjusting the color values of a first set of said image elements using said selected color deficiency correction, wherein said first set comprises elements of a first content type, wherein said adjusting is performed by a hardware processor;
   wherein said adjusting results in increased perception by a viewer with said color deficiency.

18. A method for enhancing an image for increased perception by a visually-challenged viewer, said method comprising:
   identifying image elements by content type;
   identifying a type of visual impairment;
   selecting a visual impairment correction based on said content type and said visual impairment;
   enhancing said image elements with said content-type with said visual impairment correction to increase perception by a viewer with said visual impairment,
   wherein said enhancing is performed by a hardware processor.

19. The method of claim 18 where said visual impairment is a type of colorblindness and said enhancing comprises:
   a) applying a matrix to input color values based on a type of colorblindness of an observer; and
   b) transforming the input color values to produce a larger response in the observer's remaining cone class.

20. A method as described in claim 18 wherein said correction comprises a variable parameter and said variable parameter is varied according to at least one parameter selected from the set consisting of said document type and said color deficiency type.

* * * * *